United States Patent [19]
Ueki et al.

[11] Patent Number: 5,075,035
[45] Date of Patent: Dec. 24, 1991

[54] MOLDING MATERIAL FOR ELECTROCONDUCTIVE IC PARTS

[75] Inventors: Toru Ueki; Masaji Yoshimura; Kazuharu Kanezaki, all of Yokohama; Takashi Satoh, Kawasaki; Ineo Iwata, Yokohama; Susumu Kishi, Funabashi, all of Japan

[73] Assignee: Mitsui Toatsu Chemicals, Inc., Japan

[21] Appl. No.: 394,095

[22] Filed: Aug. 15, 1989

[30] Foreign Application Priority Data

Aug. 18, 1988 [JP] Japan ................................ 63-203718
Apr. 12, 1989 [JP] Japan ................................ 1-090831
Jul. 19, 1989 [JP] Japan ................................ 1-184581

[51] Int. Cl.$^5$ ............................................. H01B 1/06
[52] U.S. Cl. ................................................. 252/511
[58] Field of Search ................ 252/511; 524/495, 496, 524/186, 210, 221, 223, 224

[56] References Cited

U.S. PATENT DOCUMENTS 4,404,125 9/1983 Abolins et al. .................... 252/511
5,004,561 4/1991 Nomura et al. ................... 252/511

FOREIGN PATENT DOCUMENTS 077059 4/1983 European Pat. Off. .
0121974 3/1984 European Pat. Off. .
226851 11/1985 European Pat. Off. .
61-112608 5/1985 Japan .
62-100553 5/1987 Japan .

OTHER PUBLICATIONS

Chemical Abstracts, vol. 105, No. 20, abstract no. 173777y, Columbus, Ohio USA.

Primary Examiner—Josphine Barr
Attorney, Agent, or Firm—Sixbey, Friedman, Leedom & Ferguson

[57] ABSTRACT

A molding material for electroconductive IC parts is here provided which has a preferable heat distortion temperature (heat resistance) and a desirable melt flow index (moldability) and which supplies molded articles having a suitable surface specific resistance. The above-mentioned molding material comprises 50% by weight or more of a polyphenylene ether resin, electroconductive carbon, an acid imide compound which can be used depending upon an intrinsic viscosity of the polyphenylene ether resin, a high-impact polystyrene resin and an A—B—A' type block copolymer elastomer.

5 Claims, No Drawings

MOLDING MATERIAL FOR ELECTROCONDUCTIVE IC PARTS

BACKGROUND OF THE INVENTION (a) Field of the Invention

The present invention relates to a molding material for IC parts which is excellent in heat resistance represented by heat distortion temperature, moldability represented by a melt flow index and electroconductivity represented by surface specific resistance of molded articles thereof (b) Description of the Related Art In electronic instruments, the mounting density of parts tends to increase, and in order to heighten the mounting density, IC are mounted on through-hole substrates and the like. However, if the IC are wet at the time of the mounting thereof by flow solder, water vapor is generated in the IC during heating, with the result that flakes or cracks appear thereon and the IC are broken. For this reason, it is necessary that prior to the mounting, the IC are dried at a temperature of 100° C. or more to remove moisture therefrom.

Heretofore, in the process of drying the IC, the IC must be once transferred from a plastic tray (or a magazine case plastic tray) having a surface specific resistance of $10^7 \Omega$ or less in order to prevent the breakdown of the IC by static electricity to an aluminum diecast tray, and be then dried. Afterward, the dried IC are returned to the plastic tray and are then shipped. Therefore, the complicated and burdensome process is required. The greatest reason why such a burdensome process is necessary is that the tray is made from polyvinyl chloride or polystyrene which cannot withstand heat, and is deformed at the time when the IC are dried.

Thus, for the simplification of the process and for the replacement of the expensive aluminum diecast tray, much attention is paid to a plastic tray which is resistant to a temperature of 100° C. or more. On the other hand, also for wafer carriers which are used in washing silicon wafers and for racks which are used in carrying print-circuit boards in a soldering step, materials which can withstand conditions of 100° C. or more are demanded. Additionally, in order to shorten a drying period of time, it is also desired to achieve drying at a higher temperature, and preferably plastic trays which are resistant to a drying temperature of 130° C. or more are demanded.

As materials which can satisfy the above-mentioned requirement, polyamide resins, polyester reins and the like containing glass fiber can be contrived, but these resins are all crystalline and hence they have a high mold shrinkage ratio and are poor in dimensional stability. Furthermore, there are also amorphous resins such as polycarbontes in which glass fiber is contained, but these resins are poor in the moldability. In addition, molded articles thereof tend to warp and have low dimensional stability. As highly heat-resistant amorphous resins, blends of polyphenylene ether resins and high-impact polystyrene resins are under investigation, but materials which can simultaneously satisfy the requirements of heat resistance and the moldability have not been obtained yet.

As a result of researches of the present inventors, it has been found that when the content of the polyphenylene ether resin is increased to 50% by weight or more with the intention of heightening heat distortion temperature up to 130° C. or more, the moldability is too poor to accomplish injection molding. Even if the molding can be made, stress remains in molded articles, and an inconvenient phenomenon such as warpage occurs in a subsequent heating step. Moreover, high shear force at the time of the molding inconveniently functions to break the uniformed dispersion state of electroconductive carbon, so that the surface specific resistance of the molded articles exceeds a level of $10^7 \Omega$. When the content of the polyphenylene ether resin is decreased to less than 50% by weight so as to improve the moldability, the heat distortion temperature is 130° C. or less, and in the subsequent heating step, warpage and distortion take place similarly. Polyether sulfones, polyallylates and polyether imides can be also taken up, but these electroconductive polymers containing electroconductive carbon are not practical because of the poor mold-ability.

SUMMARY OF THE INVENTION

A first object of the present invention is to provide a molding material for electroconductive IC parts which can supply molded articles not having warpage and shrinkage even at high temperatures of 130° C. or more in, for example, a drying step.

Another object of the present invention is to provide a molding material for electroconductive IC parts in which the uniformed dispersion state of electroconductive carbon is not broken even under high shear force at the time of molding and in which the surface specific resistance of molded articles thereof is $10^7 \Omega$ or less, preferably $10^5 \Omega$ or less.

Still another object of the present invention is to provide a molding material for electroconductive IC parts which is useful for the manufacture of the molded articles for shipping or transportation of IC.

The above-mentioned objects of the present invention can be achieved by providing a molding material for electroconductive IC parts which has a heat distortion temperature of 130° C. or more (under a bending stress of 18.5 kg/cm$^2$ in accordance with JIS-K7207) and a melt flow index of 3 g/10 minutes or more (under a load of 10 kg at 300° C. in accordance with JIS-K7210) and which provides molded articles for IC parts having a surface specific resistance of $10^7 \Omega$ or less and which contains at least 50% by weight of a polyphenylene ether resin.

DETAILED DESCRIPTION OF THE INVENTION

A molding material for electroconductive IC parts containing at least 50% by weight of a polyphenylene ether resin which constitutes the present invention can be prepared by several methods, depending upon the kind of polyphenylene ether resin used, particularly its intrinsic viscosity.

The polyphenylene ether resin used in the present invention usually has a molecular weight of 0.45 to 0.5 dl/g in terms of an intrinsic viscosity measured in a chloroform solution at 25° C. The polyphenylene ether resin is commercially available from, for example, GEM Polymer Co., Ltd.

In the case that this kind of polyphenylene ether resin is used, the molding material of the present invention may be prepared from a resin composition comprising 50 to 90% by weight of the polyphenylene ether resin, 1 to 20% by weight of an acid imide compound, 0 to 40% by weight of a high-impact polystyrene resin, 0 to 20% by weight of an A—B—A' type block copolymer elastomer (where each of A and A' is a polymerized vinyl aromatic hydrocarbon block, and B is a polymerized conjugated diene block or a hydrogenated, polymerized conjugated diene block), and 5 to 40% by weight of electroconductive carbon, the total of these components being 100% by weight.

With regard to the above-mentioned components constituting the molding material of the present invention, the amount of the polyphenylene ether resin is usually from 50 to 90% by weight, preferably from 50 to 80% by weight, that of the acid imide compound is usually from 1 to 20% by weight, preferably from 3 to 20% by weight, that of the high-impact polystyrene resin is usually from 0 to 40% by weight, preferably from 5 to 35% by weight, that of the A—B—A' type block copolymer elastomer is usually from 0 to 20% by weight, preferably from 3 to 15% by weight, and that of the electroconductive carbon is usually from 5 to 40% by weight, preferably from 5 to 15% by weight. When the amount of the polyphenylene ether resin is less than 50% by weight or more than 90% by weight, the molding material for IC parts having high heat resistance and excellent electroconductivity which are features of the present invention cannot be obtained. When the amount of the acid imide compound is less than 1% by weight, moldability is poor, and when it is more than 20% by weight, mechanical strength of molded articles thereof is unpreferably low. The high-impact polystyrene resin and the A—B—A' type block copolymer can be used in amounts of 40% by weight or less and 20% by weight or less, respectively, for the purpose of increasing impact strength of molded articles thereof. When the amount of the electroconductive carbon is less than 5% by weight, it is difficult to bring the surface specific resistance of the molded articles into a level of $10^7$ Ω or less, and inversely when it is in excess of 40% by weight, moldability is unpreferably poor.

The polyphenylene ether resin having an intrinsic viscosity of 0.45 dl/g or less may be prepared by known methods disclosed in Japanese Patent Publication Nos. 36496/1970 and 33908/1970. In the case that the polyphenylene ether resin having an intrinsic viscosity of 0.25 to 0.45 dl/g is used, the molding material of the present invention may be prepared from a resin composition comprising 50 to 90% by weight of the polyphenylene ether resin, 0 to 40% by weight of a high-impact polystyrene resin, 0 to 20% by weight of an A—B—A' type block copolymer elastomer, and 5 to 40% by weight of electroconductive carbon, the total of these components being 100% by weight.

With regard to the above-mentioned components constituting the molding material of the present invention, the amount of the polyphenylene ether resin is usually from 50 to 90% by weight, preferably from 55 to 80% by weight, that of the high-impact polystyrene resin is usually from 0 to 40% by weight, preferably from 5 to 35% by weight, that of the A—B—A' type block copolymer elastomer is usually from 0 to 20% by weight, preferably from 3 to 15% by weight, and that of the electroconductive carbon is usually from 5 to 40% by weight, preferably from 5 to 15% by weight In the case that the polyphenylene ether resin having an intrinsic viscosity of 0.25 dl/g or less is used, the molded articles made therefrom have low impact strength, and therefore 40% by weight or more of the high-impact polystyrene resin or 20% by weight or more of the A—B—A' type block copolymer elastomer is necessary to build up the impact strength, but in such a case, heat resistance deteriorates, so that the molding material containing the above-mentioned kind of polyphenylene ether resin cannot be used under high-temperature conditions. When the amount of the polyphenylene ether resin is less than 50% by weight or more than 90% by weight, the molding material for IC parts having high heat resistance and excellent electroconductivity which are features of the present invention cannot be obtained. The high-impact polystyrene resin and the A—B—A' type block copolymer can be used in amounts of 40% by weight or less and 20% by weight or less, respectively, for the purpose of increasing impact strength of molded articles thereof. When the amount of the electroconductive carbon is less than 5% by weight, it is difficult to bring the surface specific resistance of the molded articles into a level of $10^7$ Ω or less, and inversely when it is in excess of 40% by weight, moldability is unpreferably poor.

From the above-mentioned composition, the molding material for electroconductive IC parts can be obtained which has a heat distortion temperature of 130° C. or more (under a bending stress of 18.5 kg/cm² in accordance with JIS-K7207) and a melt flow index of 3 g/10 minutes or more (under a load of 10 kg at 300° C. in accordance with JIS-K7210) and which provides the molded articles for IC parts having a surface specific resistance of $10^7$ Ω or less and which contains at least 50% by weight of the polyphenylene ether resin.

The polyphenylene ether resin constituting the present invention is desirably a homopolymer or a copolymer containing one or more kinds of units represented by the general formula

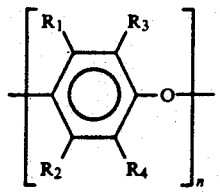

wherein each of $R_1$, $R_2$, $R_3$ and $R_4$ is independently selected from the group consisting of hydrogen, a halogen, a hydrocarbon, a halohydrocarbon, a hydrocarbon oxy and a halohydrocarbon oxy, and n which indicates the total number of the monomer units is an integer of 20 or more.

Manufacturing methods of the polyphenylene ether resin are not particularly restrictive, and the polyphenylene ether resin can be manufactured by the reaction of a phenol in accordance with any of the methods described in U.S. Pat. Nos. 3306874, 3306875, 3257357 and 3257358. Examples of the phenol include 2,6-dimethylphenol, 2,6-diethylphenol, 2,6-dibutylphenol, 2,6-dilaurylphenol, 2,6-dipropylphenol, 2,6-diphenylphenol, 2-methyl-6-ethylphenol, 2-methyl-6-cyclohexylphenol, 2-methyl-6-methoxyphenol, 2-methyl-6-butylphenol, 2,6-dimethoxyphenol, 2,3,6-trimethylphenol, 2,3,5,6-tetramethylphenol and 2,6-diethoxyphenol. These phenols are not restrictive.

In the present invention, the preferable polyphenylene ether resin is poly(2,6-dimethyl-1,4-phenylene) ether, and the usable polyphenylene ether resin has an intrinsic viscosity in the range of 0.25 to 0.5 dl/g.

As the acid imide compound, a cyclic imide compound is used which is generally derived from $NH_3$ or a primary amine compound and an acyl group of a dibasic acid. Examples of the primary amine compound include aniline, cyclohexylamine, P-hydroxyaniline, and examples of the dibasic acid include succinic acid, glutaric acid, phthalic acid and maleic acid. That is, typical examples of the acid imide compound include succinimide, glutarimide, phthalimide, N-phenylphthalimide, N-phenylmaleimide, N-cyclohexylmaleimide, N-(p-hydroxyphenyl)maleimide, N-(p-carboxyphenyl)maleimide and N-(p-chlorophenyl)maleimide.

The A—B—A' type block copolymer elastomer is composed of vinyl aromatic hyrocarbon polymer A and A' blocks and a conjugated diene polymer B block. Examples of the vinyl aromatic hydrocarbon include styrene, α-methylstyrene, vinyltoluene, vinylxylene, ethylvinylxylene, vinylnaphthalene and mixtures thereof. The A and A' blocks may be different or identical. Furthermore, examples of the conjugated diene include 1,3-butadiene and isoprene and mixtures thereof. In addition, the conjugated diene polymer B block which is hydrogenated can be used suitably in the present invention. The A—B—A' type block copolymer elastomer used in the present invention is commercially available, and it can be manufactured in a known manner by a person skilled in the art.

In the present invention, the electroconductive carbon is added so as to provide the product with electroconductivity. The electroconductive carbon, when added to the resin, functions to impart the high electroconductivity thereto and to thereby notably decrease the surface resistance of the resin. Typical examples of the electroconductive carbon include Ketchen Black EC (trade name; made by Akzo Zout Chemie Nederland N.V. in The Netherlands), Vulcan XC72 (CABOT Co., Ltd. in U.S.A.), and electroconductive carbon black #3050, 3150, 3250, 3750 and 3950 made by Mitsubishi Chemical Industries, Ltd.

A manufacturing method of the IC parts regarding the present invention is not particularly restrictive, and a usual known method can be employed. That is, raw materials, which are a polyphenylene ether resin, an electroconductive carbon, and if necessary, an acid imide compound, an impact resistance improver and the like, are uniformly mixed by means of a high-speed stirring machine. Afterward, a single screw extruder or a multi-screw extruder having sufficient kneading power is used to carry out melting/kneading and to then form pellets, and the desired IC parts are then prepared from the pellets through injection molding or extrusion. In compliance with a purpose, it is possible to add a pigment, a reinforcement material such as glass fiber, metallic fiber and carbon fiber, a filler such as talc or calcium carbonate, an antioxidant, an ultraviolet absorber, a lubricant, a flame retarder and an antistatic agent. Particularly in the present invention, even when the glass fiber is added, the flowability deteriorates only a little, and dimensional stability and heat resistance can be improved.

EXAMPLES

The present invention will be described in detail in reference to examples. In this connection, characteristics of resin compositions and molded articles referred to in examples and comparative examples were evaluated by the following procedures.

(1) Melt Flow Index (moldability)

The melt flow index was evaluated at a temperature of 300° C. under a load of 10 kg in accordance with JIS-K2210.

(2) Heat Distortion Temperature

The heat distortion temperature was evaluated under a bending stress of 18.56 kg/cm² in accordance with JIS-K7207.

(3) Surface Specific Resistance of Molded Articles

The surface specific resistance was evaluated by the use of a two-point terminal surface specific resistance measuring instrument (trade name Resistat; made by Mitsubishi Petrochemical Co., Ltd.).

(4) Heat resistance of Molded Articles

Heat resistance was evaluated by allowing an IC tray specimen having a size of 300 mm × 150 mm, an average wall thickness of 1.5 mm and a weight of 120 g to stand in an atmosphere at 130° C. for 24 hours, and then measuring warpage and shrinkage of the specimen. The warpage and the shrinkage were measured through a visual observation and by the use of a vernier caliper, respectively, in order to obtain a shrinkage ratio, which will be defined hereinafter. The molded articles having shrinkage ratios of 0.4% or less were estimated to be successful.

Shrinkage ratio=(shrinked quantity)/(total length of molded article)×100

(5) Mechanical Strength of Molded Articles

Molded articles were dropped on concrete from a height of 2 meters, and the unbroken specimens were estimated to be successful.

EXAMPLES 1 TO 6

Raw materials were mixed in each ratio shown in Table 1 which were a polyphenylene ether resin (made by GEM Polymer Co., Ltd.; its intrinsic viscosity in chloroform at 25° C. was 0.5 dl/g), a high-impact polystyrene resin (made by Mitsui Toatsu Chemicals, Inc.; trade name Torpolex 855-52), electroconductive carbon (made by Akzo Zout Chemie Nederland N.V. in The Netherlands; trade name Ketchen Black EC), a hydrogenated styrene-butadiene-styrene block copolymer as an A—B—A' type block copolymer elastomer (made by Shell Chemical Inc.; trade name Creton G-1650) and N-phenylmaleimide as an acid imide compound. The mixture was then kneaded at a temperature in the range of 270° to 300° C. and extruded to form pellets, and from the thus formed pellets, specimens and IC trays were prepared by means of injection molding. The results of evaluation are set forth in Table 1.

EXAMPLE 7

The same procedure as in Examples 1 to 3 was used with the exception that a styrene-butadiene-styrene block polymer (made by Shell Chemical Inc.; trade name Califlex TR-1101) as the A—B—A' type block copolymer elastomer and succinimide as the acid imide compound were mixed in a ratio shown in Table 1.

EXAMPLE 8

The same procedure as in Example 7 was repeated with the exception that N-hexylmaleimide was employed as the acid imide compound. The results are set forth in Table 1.

EXAMPLE 9

The same procedure as in Example 8 was used with the exception that glass fiber having a fiber length of 1.5 mm and a diameter of 11 μm was mixed in a ratio shown in Table 1.

EXAMPLES 10 AND 11

The same procedure as in Example 1 was used with the exception that any acid imide was not used and a polyphenylene ether resin having an intrinsic viscosity of 0.35 dl/g in chloroform at 25° C. and other raw materials were mixed in each ratio shown in Table 1. Afterward, the mixture was kneaded at a temperature within the range of 270° to 300° C. and was then formed to pellets. Specimens and IC trays were made from the thus formed pellets by injection molding, and the results of evaluation are set forth in Table 1.

COMPARATIVE EXAMPLES 1 TO 4

Raw materials were mixed in each ratio shown in Table 2, and kneading was performed at a temperature in the range of 270° to 300° C., followed by pelleting. Specimens and IC trays were made from the thus formed pellets by means of injection molding, and the results of evaluation are set forth in Table 2. In these comparative examples, some of moldability, heat resistance (warpage) and surface resistance deteriorated notably. After all, any products having sufficiently practical values could not be obtained.

COMPARATIVE EXAMPLES 5 AND 6

Raw materials were mixed in each ratio shown in Table 2 which were a polyphenylene ether resin (having an intrinsic viscosity of 0.2 dl/g in a chloroform solution at 25° C.), a high-impact polystyrene resin (made by Mitsui Toatsu Chemicals, Inc.; trade name Torpolex 855-52), a hydrogenated styrene-butadiene-styrene block copolymer as an A—B—A' type block copolymer elastomer (made by Shell Chemical Inc.; trade name Creton G-1650) and electroconductive carbon (made by Akzo Zout Chemie Nederland N.V. in The Netherlands; trade name Ketchen Black EC). The mixture was then kneaded at a temperature in the range of 270° to 300° C., followed by pelleting. Afterward, from the thus formed pellets, specimens and IC trays were prepared by means of injection molding. The results of evaluation are set forth in Table 2. In these comparative examples, either of heat resistance (warpage) and mechanical strength deteriorated notably. After all, any products having sufficiently practical values could not be obtained.

TABLE 1

| Components and Characteristics | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Polyphenylene ether resin (wt %) | 50 | 60 | 70 | 50 | 72 | 62 | 60 | 60 | 50 | 60 | 70 |
| [intrinsic viscosity (dl/g)] | (0.5) | (0.5) | (0.5) | (0.5) | (0.5) | (0.5) | (0.5) | (0.5) | (0.5) | (0.35) | (0.35) |
| High-impact polystyrene (wt %) | 35 | 25 | 10 | 20 | — | 10 | 15 | 15 | 10 | 25 | 15 |
| Ketchen black (wt %) | 10 | 10 | 10 | 20 | 8 | 8 | 10 | 10 | 10 | 10 | 10 |
| A-B-A' black elastomer (wt %) | — 0 | — 0 | G1650 5 | G1650 5 | G1650 15 | G1650 5 | TR-1101 7 | TR-1101 7 | TR-1101 5 | G1650 5 | G1650 5 |
| Acid imide compound (wt %) | N-phe 5 | N-phe 5 | N-phe 5 | N-phe 5 | N-phe 5 | N-phe 15 | succi 8 | N-cyc 8 | N-cyc 5 | — 0 | — 0 |
| Melt flow index (g/10 min) | 20 | 17 | 12 | 6 | 14 | 20 | 13 | 14 | 6 | 14 | 12 |
| Heat distortion temp. (°C.) | 142 | 150 | 164 | 160 | 162 | 157 | 160 | 160 | 165 | 150 | 164 |
| Distortion and warpage of molded articles | O | O | O | O | O | O | O | O | O | O | O |
| Mechanical strength of molded articles | O | O | O | O | O | O | O | O | O | O | O |
| Surface resistance of molded articles (Ω) | $10^5$ | $10^5$ | $10^5$ | $10^3$ | $10^6$ | $10^6$ | $10^5$ | $10^5$ | $10^5$ | $10^5$ | $10^5$ |

Note 1: "N-phe" means N-phenylmaleimide.
Note 2: "succi" and "N-cyc" mean succinimide and N-cyclohexylmaleimide, respectively.
Note 3: In Example 9, glass fiber was contained in an amount of 20% by weight.
Note 4: "O" means that the molded articles were successful.

TABLE 2

| Components and Characteristics | Comparative Example | | | | | |
|---|---|---|---|---|---|---|
| | 1 | 2 | 3 | 4 | 5 | 6 |
| Polyphenylene ether resin (wt %) | 40 | 60 | 70 | 55 | 70 | 40 |
| [intrinsic viscosity (dl/g)] | (0.5) | (0.5) | (0.5) | (0.5) | (0.2) | (0.2) |
| High-impact polystyrene (wt %) | 50 | 30 | 15 | 41 | 20 | 30 |
| Ketchen black (wt %) | 10 | 10 | 10 | 4 | 10 | 10 |
| A-B-A' black elastomer (wt %) | — 0 | — 0 | G1650 5 | — 0 | — 0 | G1650 20 |
| Melt flow index (g/10 min) | 4 | 1.5 | 0.6 | 10 | 20 | 15 |
| Heat distortion temp. (°C.) | 120 | 152 | 170 | 135 | 145 | 120 |
| Distortion and warpage of molded articles | X | X | flow-ability was bad, molding was impossible | O | cracks took place at the time of molding | X |
| Mechanical strength of molded articles | O | O | | O | | O |
| Surface resistance of molded articles (Ω) | $10^5$ | $10^9$ | | $10^{14}$ or more | | $10^5$ |

Note: "X" and "O" mean failure and success, respectively.

What is claimed is:
1. A molding material for electroconductive IC parts comprising a resin composition which comprises:
50 to 90% by weight of a polyphenylene ether resin which is a homopolymer or a copolymer represented by the general formula

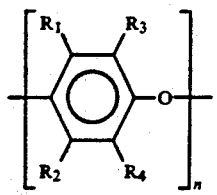

wherein each of $R_1$, $R_2$, $R_3$ and $R_4$ is independently selected from the group consisting of hydrogen, and a hydrocarbon having 1–12 carbon atoms, and n, which indicates the total number of the monomer units, is an integer of 20 or more;

1 to 20% by weight of an acid imide compound selected from the group consisting of succinimide, glutarimide, phthalimide, N-phenylphthalimide, N-phenylmaleimide, N-cyclohexylmaleimide, N-(p-hydroxphenyl)maleimide, N-(p-carboxyphenyl)maleimide and N-(p-chlorophenyl)maleimide; and 5 to 40% by weight of electroconductive carbon, the total of these components being 100% by weight; and which has a heat distortion temperature of 130° C. or more (under a bending stress of 18.5 kg/cm² in accordance with JIS-K7207), a melt flow index of 3 g/10 minutes or more (under a load of 10 kg at 300° C. in accordance with JIS-K7210) and which provides molded articles for IC parts having a surface specific resistance of $10^7$ Ω or less.

2. The molding material for electroconductive IC parts according to claim 1 wherein said resin composition comprises 50 to 90% by weight of said polyphenylene ether resin, 1 to 20% by weight of said acid imide compound, 0 to 40% by weight of a high-impact polystyrene resin, 0 to 20% by weight of an A—B—A′ block copolymer (where each of A and A′ is a polymerized vinyl aromatic hydrocarbon block, and B is a polymerized and conjugated diene block or a hydrogenated, polymerized and conjugated diene block), and 5 to 40% by weight of electroconductive carbon, the total of these components being 100% by weight.

3. The molding material for electroconductive IC parts according to claim 2 wherein said resin composition comprises 50 to 80% by weight of said polyphenylene ether resin, 3 to 20% by weight of said acid imide compound, 5 to 35% by weight of said high-impact polystyrene resin, 3 to 15% by weight of said A—B—A′ block copolymer, and 5 to 15% by weight of electroconductive carbon, the total of these compounds being 100% by weight.

4. The molding material for electroconductive IC parts according to claim 1 wherein the polyphenylene ether resin is poly(2,6-dimethyl-1,4-phenylene) ether.

5. The molding material for electroconductive IC parts according to claim 2 wherein the A—B—A′ block copolymer elastomer is a block copolymer of a vinyl aromatic hydrocarbon selected from the group consisting of styrene, α-methylstyrene, vinyltoluene, vinylxylene, ethylvinylxylene, vinylnaphthalene and mixtures thereof and a monomer selected from 1,3-butadiene and isoprene.

* * * * *